(12) United States Patent
Murao et al.

(10) Patent No.: US 9,633,763 B2
(45) Date of Patent: Apr. 25, 2017

(54) WIRE HARNESS AND CONNECTOR COMPONENT

(71) Applicant: SUMITOMO WIRING SYSTEMS, LTD., Mie (JP)

(72) Inventors: Kazuyoshi Murao, Mie (JP); Eriko Murata, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/781,407

(22) PCT Filed: Mar. 26, 2014

(86) PCT No.: PCT/JP2014/058402
§ 371 (c)(1),
(2) Date: Sep. 30, 2015

(87) PCT Pub. No.: WO2014/171274
PCT Pub. Date: Oct. 23, 2014

(65) Prior Publication Data
US 2016/0027553 A1 Jan. 28, 2016

(30) Foreign Application Priority Data

Apr. 16, 2013 (JP) ................................. 2013-085823

(51) Int. Cl.
*H01B 7/00* (2006.01)
*H01B 7/40* (2006.01)
(Continued)

(52) U.S. Cl.
CPC ........... *H01B 7/40* (2013.01); *B65D 63/1072* (2013.01); *F16L 3/1066* (2013.01); *F16L 3/233* (2013.01);
(Continued)

(58) Field of Classification Search
CPC ........ H01B 7/40; H01B 7/0045; H01R 13/73; H02G 3/32
(Continued)

(56) References Cited

U.S. PATENT DOCUMENTS 2,964,274 A * 12/1960 Richardson ............... H02G 3/32
248/68.1
4,397,435 A * 8/1983 Fisher ....................... F16L 3/00
24/21
(Continued)

FOREIGN PATENT DOCUMENTS

JP 60-184275 12/1985
JP 06-119953 4/1994
(Continued)

OTHER PUBLICATIONS

Search Report in PCT/JP2014//058402, dated Jun. 17, 2014.

*Primary Examiner* — Steven T Sawyer
(74) *Attorney, Agent, or Firm* — Greenblum & Bernstein, P.L.C.

(57) ABSTRACT

Provided is a wire harness that enables a connector component and a cable bundle to be attached to an external member while facilitating the operation and preventing wobbling of the connector component. The connector component is connected to a cable branch line on the radially outward side of the cable bundle, and includes a pair of confining surfaces on each of two sides in the circumferential direction of the cable bundle. The pair of confining surfaces face each other across a gap. The bundling member is disposed between the pair of confining surfaces, and is wound around the connector component and the cable bundle together from the outer side. The fixture is fixed to the bundling member and to an external member.

7 Claims, 5 Drawing Sheets

(51) Int. Cl.
  *H01R 13/73* (2006.01)
  *H02G 3/32* (2006.01)
  *B65D 63/10* (2006.01)
  *F16L 3/10* (2006.01)
  *F16L 3/233* (2006.01)
(52) U.S. Cl.
  CPC ........... *H01B 7/0045* (2013.01); *H01R 13/73* (2013.01); *H02G 3/32* (2013.01)
(58) Field of Classification Search
  USPC .................. 174/72 A; 248/68.1, 74.3, 61
  See application file for complete search history.

(56) References Cited

U.S. PATENT DOCUMENTS

| | | | | |
|---|---|---|---|---|
| 5,102,075 | A * | 4/1992 | Dyer | B65D 63/16 24/16 PB |
| 5,538,208 | A * | 7/1996 | Cordes | H02G 3/26 248/68.1 |
| 2001/0017338 | A1* | 8/2001 | Kamekawa | B60R 16/0215 248/71 |
| 2007/0007398 | A1* | 1/2007 | Franks | F16L 3/233 248/74.3 |
| 2009/0126162 | A1* | 5/2009 | Head | F16L 3/233 24/115 K |
| 2011/0239412 | A1* | 10/2011 | Sano | F16B 21/086 24/16 R |

FOREIGN PATENT DOCUMENTS

| | | |
|---|---|---|
| JP | 07-011832 | 2/1995 |
| JP | 07-073939 | 3/1995 |
| JP | 09-115604 | 5/1997 |
| JP | 2001-251739 | 9/2001 |
| JP | 2001-319721 | 11/2001 |

* cited by examiner

WIRE HARNESS AND CONNECTOR COMPONENT

TECHNICAL FIELD

The present invention relates to a wire harness and a connector component, and relates particularly to a wire harness provided with a connector component at a position midway in the longitudinal direction of the wire harness.

BACKGROUND ART

Patent Document 1 discloses a wire harness provided with a joint connector. Front ends of branch lines branched from main lines of the wire harness are inserted into that joint connector, and thereby the joint connector and the branch lines are connected to each other. This joint connector is arranged on the radially outward side of the main lines.

Patent Document 1 further discloses a technique for forming a protrusion having a through-hole on the radially outward surface of the joint connector. In Patent Document 1, by way of an example, this protrusion is provided on the surface (surface abutting on the main lines) on the main line side of the radially outward surfaces of the joint connector. Furthermore, this through-hole is formed through the protrusion in the circumferential direction of the wire harness. The main lines are bound together with a fixing band passed through the through-hole. With this structure, the joint connector and the main lines are fixed to each other with the fixing band.

Furthermore, Patent Documents 2 and 3 are disclosed as techniques relevant to the present invention.

CITATION LIST

Patent Documents

Patent Document 1: JP H7-73939A
Patent Document 2: JP H9-115604A
Patent Document 3: JP 2001-319721A

SUMMARY OF INVENTION

Technical Problem

FIG. 9 shows the state in which a joint connector 30' of Patent Document 1 is fixed to main lines 10' with a fixing band 20'. The joint connector 30' is provided with a single protrusion (not shown in FIG. 9) on the main line 10' side, and is fixed by passing the fixing band 20' through this protrusion. Because this single protrusion is arranged in the vicinity of the center of the joint connector 30' and the joint connector 30' is located at a position further radially outward than the fixing band 20', the position of the joint connector 30' is likely to change. Such a change is undesirable, and wobbling of the joint connector 30' is preferably suppressed.

Here, it is conceivable that the wire harness of Patent Document 1 is also attached to an external member (for example, an automobile body). As shown in FIG. 9, for example, it is conceivable that fittings 40' are attached to the wire harness (main lines) 10' at two positions between which the joint connector 30' is disposed, and then are fixed to the external member (not shown). A fitting that includes a band 41' that is wound around the main lines 10' and a fixture 42' that can be fixed to the band 41' as well as to the external member may be used as such a fitting 40'.

However, when the fittings 40' are used in this manner, operations for attaching the fittings 40' at two different positions are required.

Therefore, it is an object of the present invention to provide a wire harness that includes a connector component and a cable bundle that are capable of being attached to an external member with a simple operation, while suppressing wobbling of the connector component.

Solution to Problem

A first aspect of a wire harness according to the present invention is directed to a wire harness including: a cable bundle including a cable main line and a cable branch line that is branched from the cable main line; a connector component that is connected to the cable branch line on a radially outward side of the cable bundle, and includes, on each of two sides thereof in a circumferential direction with respect to the central axis of the cable bundle, a pair of confining surfaces that face each other across a gap; a bundling member that is disposed between the confining surfaces on each of the two sides, and is wound around the connector component and the cable bundle together from the outer side; and a fixture that is fixed to the bundling member and to an external member.

A second aspect of the wire harness according to the present invention is directed to the wire harness according to the first aspect, wherein the fixture and the cable bundle sandwich the connector component from opposite sides.

A third aspect of the wire harness according to the present invention is directed to the wire harness according to the first or second aspect, wherein the pairs of confining surfaces project from side sections of the connector component, the connector component further includes bridge sections that bridge front ends of the pairs of confining surfaces, and the bundling member passes through through-holes that are formed by the pairs of confining surfaces, the side sections, and the bridge sections.

A fourth aspect of the wire harness according to the present invention is directed to the wire harness according to the first or second aspect, wherein the pairs of confining surfaces are open to the outer side.

A fifth aspect of the wire harness according to the present invention is directed to the wire harness according to the fourth aspect, wherein the connector component has, on two sides thereof, recesses, and the pairs of confining surfaces form two end surfaces in a longitudinal direction of each recess.

A sixth aspect of the wire harness according to the present invention is directed to the wire harness according to any one of the first to fifth aspects, wherein the fixture is molded into one piece with the bundling member.

A seventh aspect of the wire harness according to the present invention is directed to the wire harness according to any one of the first to sixth aspects, wherein the fixture includes a belt passage section through which the bundling member passes, and a fixed section that is provided on the belt passage section on a side opposite to the cable bundle, and is fixed to the external member.

An eighth aspect of the wire harness according to the present invention is directed to the wire harness according to any one of the first to seventh aspects, wherein the bundling member is a bundling band.

A connector component according to the present invention includes: a housing body that houses one end of the cable; and pairs of confining surfaces provided on two sides of the housing body with the one end of the cable disposed between the sides, the confining surfaces of each pair facing each other across a gap.

Advantageous Effects of Invention

According to the first aspect of the wire harness of the present invention, the bundling member is disposed between the pair of confining surfaces on each of two sides in the circumferential direction of the connector component, and is wound around the connector component and the cable bundle together from the outer side. In such a structure, if the position of the connector component changes, the pair of confining surfaces will abut on the bundling member, and thus the position of the connector component is not likely to change. Accordingly, the connector component is not likely to wobble.

Moreover, the fixture is fixed to the bundling member for fixing the connector component. It is thus possible to improve operability as compared with a conventional case where fitting members are provided at two different positions.

Moreover, since the fixture is fixed to the bundling member for fixing the connector component, it is not necessary to provide a new bundling member for the fixture. The manufacturing cost can thus be reduced.

According to the second aspect of the wire harness of the present invention, the fixture is provided closer to the external member than the connector component, thus making it difficult for the connector component to get into contact with the external member.

According to the third aspect of the wire harness of the present invention, the connector component is not likely to disengage from the bundling member.

According to the fourth aspect of the wire harness of the present invention, assembling of the wire harness is possible by inserting the connector component into a gap between the bundling member and the cable bundle in the state in which the bundling member is loosely wound around the cable bundle, and then winding up the bundling member tightly. Moreover, the connector component can be removed in the state in which the bundling member is loosely wound. Accordingly, even if an operator installs an incorrect connector component by mistake, it is possible to replace the incorrect connector component without winding off the bundling member.

Furthermore, when an adhesive tape is employed as the bundling member, there is no need for the adhesive tape to pass through the through-hole, facilitating the winding.

According to the fifth aspect of the wire harness of the present invention, it is possible to suppress noise that is caused by the connector component getting into contact (or colliding) with a peripheral member.

Furthermore, when an adhesive tape is employed as the bundling member, there is no need for the adhesive tape to pass through the through-hole, facilitating the winding.

According to the sixth aspect of the wire harness of the present invention, the fixture and the bundling member are fixed easily.

According to the seventh aspect of the wire harness of the present invention, a conventional bundling member can be used.

According to the eighth aspect of the wire harness of the present invention, the operation is easy.

The connector component according to the present invention realizes the first aspect of the wire harness.

The object, features, aspects, and advantageous effects of this invention will become clearer from the detailed description below and the accompanying drawings.

DESCRIPTION OF EMBODIMENTS

First Embodiment
Wire Harness

Figure 1:
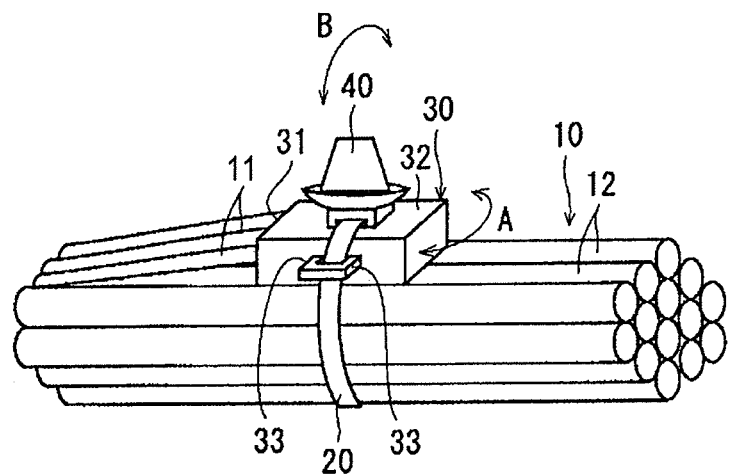
FIG. 1 is a perspective view illustrating an example of a conceptual configuration of a wire harness.
Figure 2:
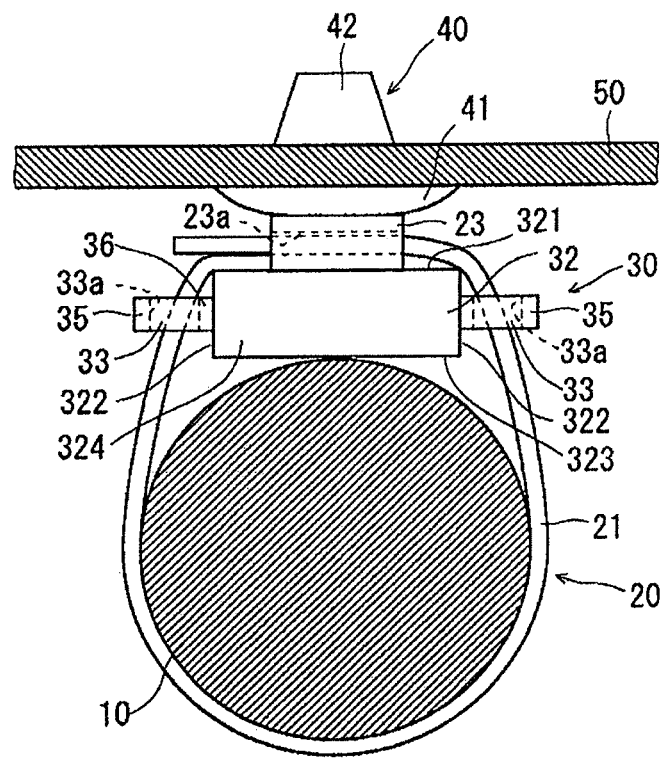
FIG. 2 is a cross-sectional view illustrating an example of the conceptual configuration of the wire harness.

FIG. 1 is a perspective view illustrating an example of a conceptual configuration of a wire harness, and FIG. 2 is a cross-sectional view perpendicular to the longitudinal direction of the wire harness. The wire harness includes a cable bundle 10, a connector component 30, a bundling member 20, and a fixture 40.

The cable bundle 10 is formed by a plurality of cables that are bundled together, and a part in the longitudinal direction of the cable bundle 10 is shown in FIG. 1. Note that "cable" in this context includes an electric wire for use in electric power supply or communication of an electric signal, and an optical fiber for use in communication of an optical signal. The cable bundle 10 may be formed only by electric wires or optical fibers. Alternatively, the cable bundle 10 may include both an electric wire and an optical fiber.

Such a cable bundle 10 is routed, for example, in an automobile to connect electronic devices provided in the automobile.

Note that, for ease of illustration of FIG. 2, the cable bundle 10 is schematically shown as a circle. Furthermore, in the following description, the circumferential direction and the radial direction with respect to the virtual central axis of the cable bundle 10 are respectively referred to simply as "circumferential direction" and "radial direction".

As shown in FIG. 1, the cable bundle 10 includes cable main lines 12 and cable branch lines 11. The cable branch lines 11 are branched from the cable main lines 12, and ends on one side of the cable branch lines 11 are connected to the connector component 30 electrically or optically.

Figure 3:
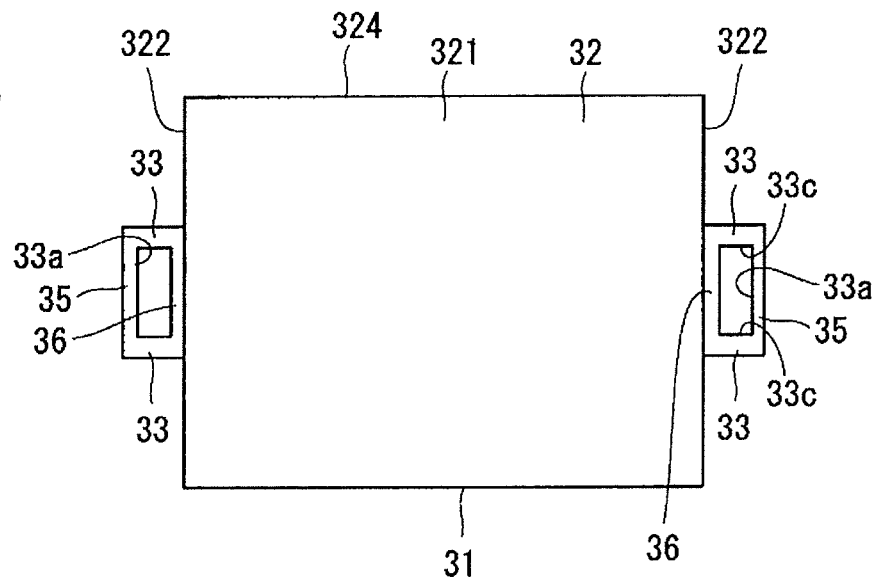
FIG. 3 is a plan view illustrating an example of a conceptual configuration of a connector component.
Figure 4:
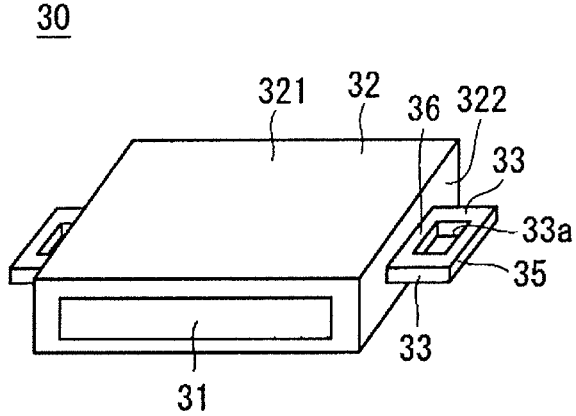
FIG. 4 is a perspective view illustrating an example of the conceptual configuration of the connector component.

The connector component 30 is arranged at a position midway in the longitudinal direction of the cable bundle 10 on the outer side of the cable bundle 10. FIG. 3 is a plan view illustrating an example of a conceptual configuration of the connector component 30, and FIG. 4 is a perspective view illustrating an example of the conceptual configuration of the connector component 30. As shown in FIG. 4, the connector component 30 includes a connector structure 31, a housing body 32, and a pair of projections 33.

The connector structure 31 is open to one side, and the ends on one side of the cable branch lines 11 are inserted into this opening (see also FIG. 1). Furthermore, as shown in FIG. 1, the connector component 30 is arranged on the outer side of the cable bundle 10 so that the connector structure 31 is open in the longitudinal direction of the cable bundle 10. Accordingly, the direction in which the cable branch lines 11 extend and the direction in which the connector structure 31 is open match each other. It is thus easy to insert the cable branch lines 11 into the connector structure 31. The connector structure 31 can be connected electrically or optically to the ends on one side of the cable branch lines 11 that were inserted into the connector structure 31. A known connector structure may be employed as the connector structure 31.

The housing body 32 is a housing that houses the connector structure 31 (ends on one side of the cable branch lines 11), and is molded with, for example, a resin. As shown in FIG. 2, this housing body 32 has a radially inward surface 323, a radially outward surface 321, and a pair of side surfaces 322. The radially inward surface 323 is a surface on the cable bundle 10 side, and the radially outward surface 321 is a surface on the side opposite to the cable bundle 10. The pair of side surfaces 322 are respectively surfaces that connect the radially inward surface 323 and the radially outward surface 321 at their two ends in the circumferential direction.

Furthermore, in the examples of FIGS. 1 to 4, the housing body 32 further has a side surface 324 that closes the connector structure 31 on the opposite side in the longitudinal direction (see particularly FIGS. 2 and 3). The side surface 324 connects to the radially inward surface 323, the radially outward surface 321, and the pair of side surfaces 322, on the opposite side in the longitudinal direction. However, it is not essential that the connector structure 31 be closed on the opposite side in the longitudinal direction. It is also possible that the connector structure 31 is open to the opposite side in the longitudinal direction and ends of other cable branch lines may be inserted into the connector structure 31 from the other side as well.

The pair of projections 33 is provided on each of the side surfaces 322 on both sides of the connector component 30. The pair of projections 33 projects from the corresponding side surface 322 substantially in the circumferential direction, the projections 33 facing each other across a gap. In other words, the side surfaces 322 are connected to the pair of projections 33 on their respective base end side. Furthermore, in the examples of FIGS. 1 to 4, bridge sections 35 are provided at the front ends of the pairs of projections 33. For example, the bridge sections 35 connect the front ends of the pairs of projections 33 to each other. Furthermore, in the examples of FIGS. 1 to 4, a protrusion 36 that protrudes from each side surface 322 in the substantially circumferential direction connects the other ends of the pair of projections 33 (base ends thereof on the side surface 322 side) to each other, and faces the bridge section 35 across a gap. Also, a through-hole 33a is formed by the pair of projections 33, the bridge section 35, and the protrusion 36. Note that if the side surface 322 is considered as including the protrusion 36, it will also be possible to explain the through-hole 33a as being formed by the pair of projections 33, the bridge section 35, and the side surface 322. Note that the protrusion 36 is not essential in view of formation of the through-hole 33a.

Furthermore, the pair of projections 33, the bridge section 35, and the protrusion 36 are provided on each of the pair of side surfaces 322. Therefore, the through-holes 33a are formed on two sides of the housing body 32 in the circumferential direction.

Such housing body 32, pair of projections 33, bridge section 35, and protrusion 36 may be formed by integral molding. Forming the housing body 32, the pair of projections 33, the bridge section 35, and the protrusion 36 using integral molding is possible, for example, by injecting a liquid resin into a metal mold, the space of which is in the shape of the combination of the housing body 32, the pair of projections 33, the bridge section 35, and the protrusion 36 to fill the space, and curing this resin. According to this method, it is easy to provide the pair of projections 33, the bridge section 35, and the protrusion 36.

As shown in FIG. 1, the bundling member 20 is wound around the housing body 32 and the cable bundle 10 from the outer side while being disposed between the pair of projections 33 on each of the two sides in the circumferential direction. Taking a more specific example, the bundling member 20 is a so-called bundling band, and includes a belt 21 and a belt supporting section 23 (see FIG. 2). The belt 21 is a section that is wound around the housing body 32 and the cable bundle 10 together while passing through the through-holes 33a. By the belt 21 passing through the through-holes 33a, the belt 21 is disposed between the pairs of projections 33. The belt 21 may have a width to the extent that it is brought into intimate contact with both projections 33 or a width that is shorter than a gap between the pair of projections 33.

Figure 5:
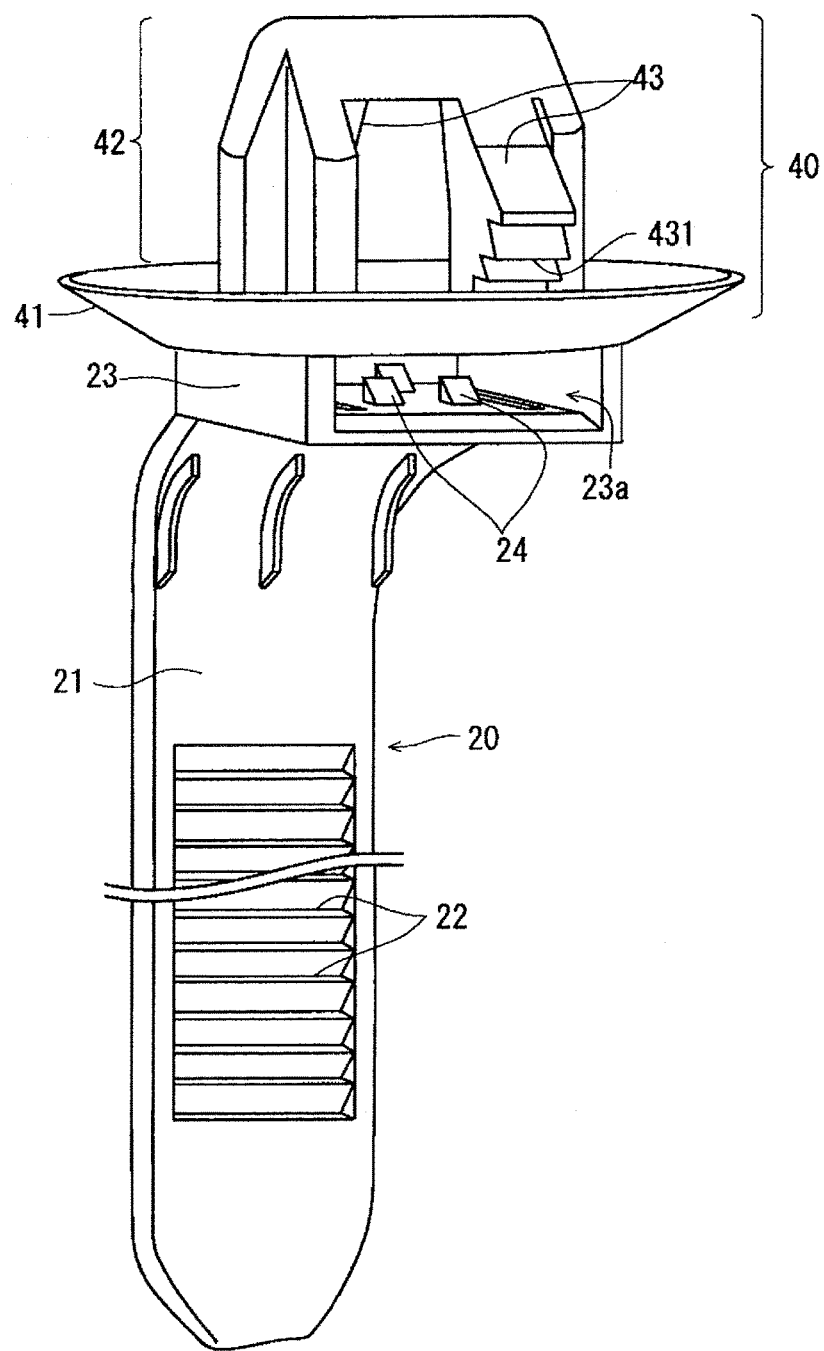
FIG. 5 is a perspective view illustrating examples of conceptual configurations of a bundling member and a fixture.

FIG. 5 is a perspective view illustrating an example of a conceptual configuration of the bundling member 20 and the fixture 40. As shown in FIG. 5, one of two ends of the belt 21 is a fixed end, and is fixed to the belt supporting section 23. The other end of the belt 21 is a free end.

The belt supporting section 23 is tubular, and its hollow section functions as a belt through-hole 23a. The belt through-hole 23a is formed through the belt supporting section 23 in the circumferential direction. Furthermore, the fixed end of the belt 21 is fixed to an edge section (the edge section on the cable bundle 10 side of FIG. 2) of the belt supporting section 23.

The belt 21 is wound around the housing body 32 and the cable bundle 10 together while passing through the through-holes 33a with the free end of the belt 21 serving as a front end, and is then inserted into the belt through-hole 23a.

One surface of the belt 21 has a plurality of grooves 22 that are aligned in the longitudinal direction of the belt 21. These grooves 22 are formed on, for example, the surface on the inner side when the belt 21 is wound around the housing body 32 and the cable bundle 10 together.

Belt confining sections 24 that correspond to the grooves 22 protrude from the inner surface of the belt supporting section 23. The belt confining sections 24 are fitted into the grooves 22 in the state in which the belt 21 is inserted into the belt through-hole 23a. Accordingly, movement of the belt 21 in the direction in which the belt 21 exits the belt through-hole 23a is limited. Confined like this, the belt 21 is wound around the housing body 32 and the cable bundle 10, holding the connector component 30 and the cable bundle 10.

The fixture 40 is capable of being fixed to the bundling member 20 and an external member 50 (such as an automobile body) (see FIG. 2).

The fixture 40 includes, for example, a flange 41 and an insertion section 42. The flange 41 is coupled to, for example, the belt supporting section 23, and extends over and beyond the upper surface of the belt supporting section 23 (the surface opposite to the cable bundle 10 as shown in FIG. 2). Furthermore, the flange 41 has the shape of, for example, a dish, and is open to the side opposite to the cable bundle 10.

The insertion section 42 projects from the flange 41 on the side opposite to the belt supporting section 23. This insertion section 42 is inserted into a fitting hole 50a of the external member 50. Furthermore, the insertion section 42 is provided with a pair of flexible expanded sections 43. Note that, for ease of illustration of FIGS. 1 to 4, the insertion section 42 is schematically shown in a trapezoid.

As shown in FIG. 5, the pair of expanded sections 43 expand respectively to the opposite side in expanding directions perpendicular to the projecting direction of the insertion section 42, and their expansion widths are changeable due to elastic deformation. The expanded sections 43 are, for example, cantilever-type members that are fixed on the front end side of the insertion section 42, and extend toward the flange 41 while bulging out in the expanding directions from the insertion section 42. Furthermore, the expanded sections 43 have claw sections 431.

This fixture 40 is fixed to the external member 50 by the insertion section 42 passing through the fitting hole 50a. More specifically, when the insertion section 42 is inserted into the fitting hole 50a, the pair of expanded sections 43 abuts on the edge section of the fitting hole 50a and is pressed. Accordingly, the expansion widths of the expanded sections 43 are reduced, and thereby also the expanded sections 43 can be inserted into the fitting hole 50a. Then, when the insertion section 42 is further inserted, the shape of the pair of expanded sections 43 returns, on the rear side of the external member 50, to the state in which the widths of the expanded sections 43 are larger than the width of the fitting hole 50a. As a result, the expanded sections 43 (more specifically, the claw sections 431) get stuck with the edge section of the fitting hole 50a, and the expanded sections 43 and the flange 41 sandwich the edge section of the fitting hole 50a from both front and rear sides. Accordingly, the fixture 40 is fixed to the external member 50.

The bundling member 20 and fixture 40 can be formed by integral molding. Forming the bundling member 20 and the fixture 40 using integral molding is possible, for example, by injecting a liquid resin into a metal mold the space of which is in the shape of the combination of the bundling member 20 and the fixture 40 to fill the space, and curing this resin. According to this method, it is easy to fix the bundling member 20 and the fixture 40.

As described above, using the bundling member 20 and the fixture 40, it is possible to attach the connector component 30 and the cable bundle 10 to the external member 50.

Moreover, as described above, the bundling member 20 is wound around the outer side of the connector component 30 while the bundling member 20 (more specifically, parts of the belt 21) is disposed between the pairs of projections 33. In such a structure, even if the connector component 30 is moved in the longitudinal direction, the pair of projections 33 will abut on the bundling member 20. In other words, surfaces 33c of the pair of projections 33 that face each other function as confining surfaces for limiting the movement of the connector component 30. Therefore, the connector component 30 is not likely to disengage from the bundling member 20. Furthermore, since the pair of projections 33 abut on the bundling member 20, the position of the connector component 30 is not likely to change (a change in the position in the A direction shown in FIG. 1). Furthermore, since the bundling member 20 is wound around the outer side of the connector component 30, it is possible to suppress a change in the position in the B direction as well. Thus, wobbling of the connector component 30 can be suppressed.

Figure 9:
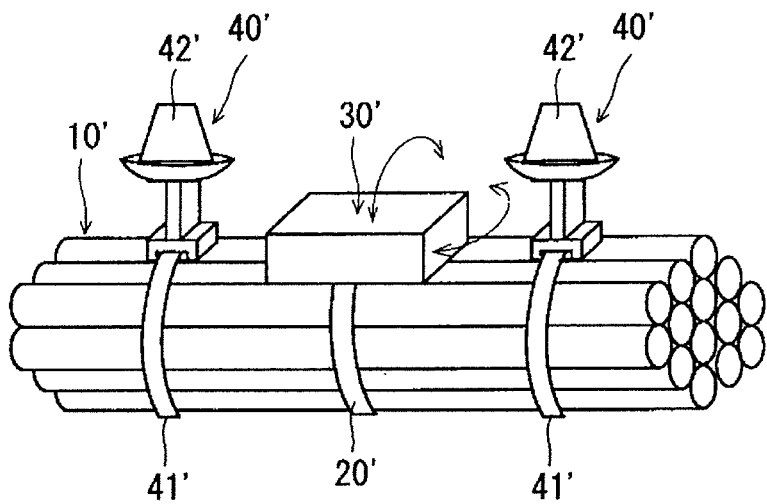
FIG. 9 is a cross-sectional view illustrating an example of a conceptual configuration of a wire harness.

Furthermore, in the wire harness of the present invention, the fixture 40 is fixed to the bundling member 20 that binds the connector component 30 and the cable bundle 10 together. Accordingly, it is possible to reduce the number of attaching operations as compared with the case of, for example, FIG. 9.

Moreover, since the bundling member 20 (more specifically, the belt 21) passes through the through-holes 33a, the connector component 30 is not likely to disengage from the bundling member 20.

Note that it is preferable that each pair of projections 33 be provided in the vicinity of the center in the longitudinal direction of the corresponding side surface 322. This will realize a state in which the bundling member 20 (more specifically, the belt 21) is located in the vicinity of the center of the housing body 32, and can hold the connector component 30 more reliably.

In the examples of FIGS. 1 to 4, the fixture 40 and the bundling member 20 are fixed as one piece. Accordingly, it is easy to fix the fixture 40 and the bundling member 20.

Figure 6:
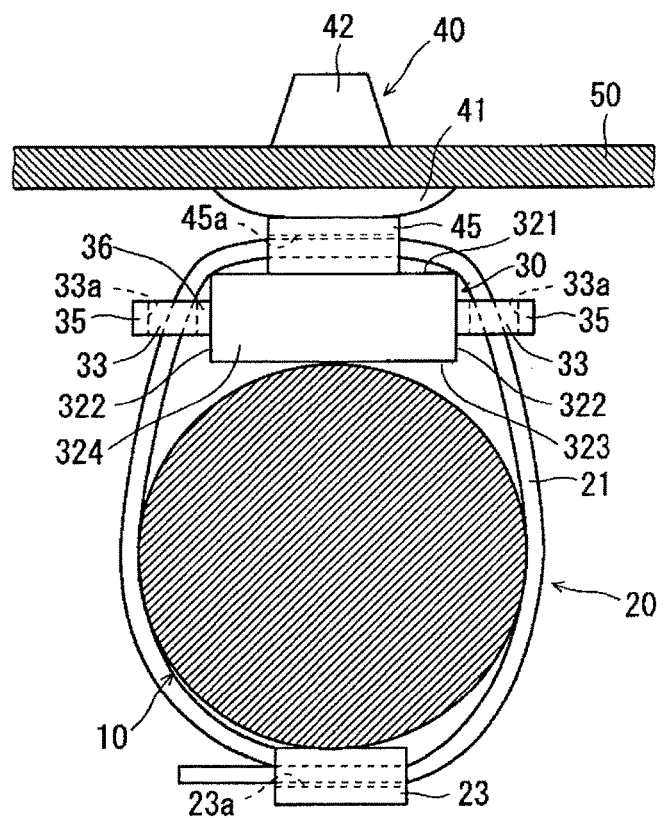
FIG. 6 is a perspective view illustrating an example of a conceptual configuration of the fixture.

Note that the fixture 40 and the bundling member 20 may be separate members. In this case, any method may be used for fixing the fixture 40 and the bundling member 20. As an example, FIG. 6 is a cross-sectional view illustrating a conceptual configuration of a fixture 40 that is formed separately from the bundling member 20. In the example of FIG. 6, the fixture 40 includes a belt passage member 45 that is, for example, tubular and through which the belt 21 passes, and a fixed section (including the flange 41 and the insertion section 42) that is provided on the belt passage member 45 from the side opposite to the cable bundle 10, and is fixed to the external member 50. The fixture 40, the bundling member 20, the connector component 30, and the cable bundle 10 are fixed to each other, since the belt 21 is wound around the connector component 30 and the cable bundle 10 while passing through the belt passage member 45. According to such a structure, a widespread conventional bundling band may be used.

Furthermore, instead of the belt passage member 45, a plate-like member (pallet-like member) extending in the longitudinal direction may be provided on the fixed section. By the belt 21 being wound around the connector component 30 and the cable bundle 10 via this plate-like member, the fixture 40, the bundling member 20, the connector component 30, and the cable bundle 10 are fixed to each other.

Furthermore, it is preferable that the fixture 40, together with the cable bundle 10, sandwich the housing body 32. In other words, it is preferable that the housing body 32 be disposed between the fixture 40 and the cable bundle 10. According to this structure, since the fixture 40 is disposed closer to the external member 50 than the connector component 30, it is difficult for the connector component 30 to collide against the external member 50.

Furthermore, in the above-described example, the belt 21 is fixed by the belt confining sections 24 of the belt supporting section 23 being fitted into the grooves 22 of the belt 21. However, the method for fixing the belt 21 is not limited to this, and any method may be used. For example, the belt 21 may have, on one end thereof, a projection and have, on the other end thereof, a through-hole into which the projection is inserted, and fixation of the belt 21 is realized by the projection being fitted into the through-hole.

Furthermore, in the above-described example, a bundling band that is fixed by mechanical binding is used as the bundling member 20. However, an adhesive tape or duct tape may be used as the bundling member 20. Note that the bundling band that is bound mechanically is preferably used in view of the easiness in passing through the through-hole 33a. Accordingly, it is possible to improve operability.

Furthermore, in the above-described example, the fixture 40 is fixed to the external member 50 by the insertion section 42 being inserted into the fitting hole 50a of the external member 50, and the expanded sections 43 getting stuck with the edge section of the fitting hole 50a. However, the method for fixing the fixture 40 to the external member 50 is not limited to this. For example, any fixing method, such as a screwing method or a method using an adhesive agent, may be used.

Second Embodiment

The following will describe a wire harness according to a second embodiment. Note that descriptions of the same items as that of the first embodiment will be omitted.

Figure 7:
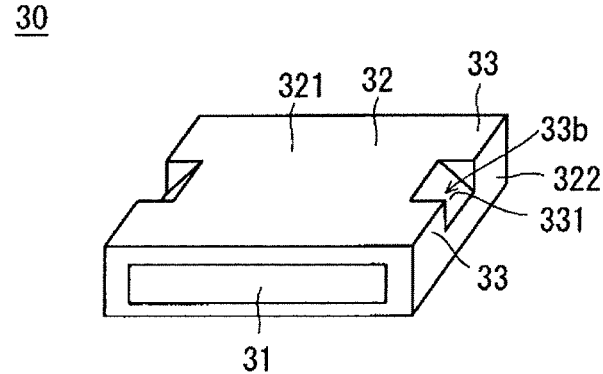
FIG. 7 is a perspective view illustrating an example of a conceptual configuration of a connector component.

FIG. 7 is a perspective view illustrating an example of a conceptual configuration of a connector component 30. The connector component 30 exemplified in FIG. 6 differs from the connector component 30 shown in FIGS. 1 to 4 in existence of the bridge section 35 and the protrusion 36, and in the structure of the projections 33.

In the example of FIG. 7, there are no protrusion 36 and bridge section 35. On the other hand, the connector component 30 of FIG. 7 has recesses 33b on its two sides (more specifically, at boundaries between the radially outward surface 321 and the side surfaces 322). Each recess 33b is formed in a part of the corresponding boundary that is away from the two ends in the longitudinal direction of the boundary.

Figure 8:
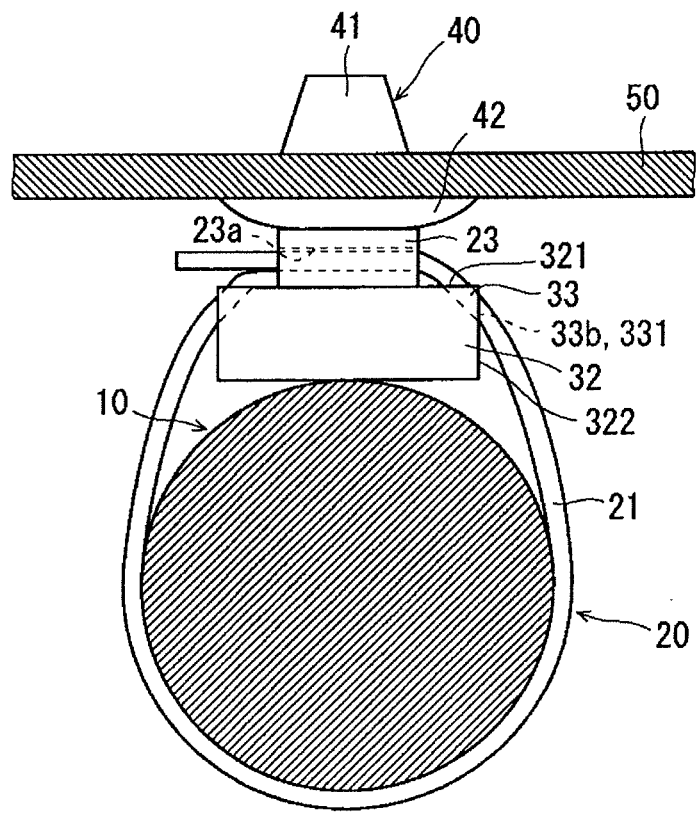
FIG. 8 is a cross-sectional view illustrating an example of a conceptual configuration of a wire harness.

FIG. 8 is a cross-sectional view illustrating a conceptual example of a wire harness using the connector component 30 of FIG. 7. As shown in FIG. 8, parts of the belt 21 are inserted into the recesses 33b. Accordingly, two end surfaces of each recess 33b sandwich the bundling member 20 (more specifically, a part of the belt 21) in the longitudinal direction. Accordingly, if the connector component 30 is moved in the longitudinal direction, the bundling member 20 will abut on the two end surfaces of the recess 33b. That is, the two end surfaces of the recess 33b functions as confining surfaces. Similarly to the first embodiment, wobbling of the connector component 30 can thus be suppressed.

Moreover, the confining surfaces are formed by forming the recess 33b, namely, by forming a recess in the boundary. Accordingly, in contrast to the first embodiment, the pair of projections 33 does not need to project from the side surface 322 or the radially outward surface 321 in the radially outward direction, making it possible to avoid the projection. It is thus possible to reduce the size of the connector component 30. Furthermore, since there is no such a projection, it is possible to prevent the connector component 30 and the external member 50 from getting into contact with each other.

Furthermore, in the example of FIG. 7, an inclined surface 331 is formed by each recess 33b. The inclined surface 331 forms a part of the outline of the recess 33b and faces the belt 21 in the substantially radial direction. This inclined surface 331 extends in the substantially circumferential direction while connecting the radially outward surface 321 and the side surface 322 to each other. This inclined surface 331 extends in the circumferential direction, and thus it is possible to increase an area in which the inclined surface 331 is in contact with the main surface of the belt 21. Therefore, the frictional force between the bundling member 20 and the connector component 30 can be increased, and the connector component 30 can stably be held.

Furthermore, in the example of FIG. 7, the pairs of projections 33 are open to the outer side. Accordingly, it is not necessary to pass the bundling member 20 through the through-holes. This is particularly advantageous for the case where an adhesive tape is used as the bundling member 20. Since an adhesive agent is applied to the adhesive tape, it is difficult to pass the adhesive tape through the through-holes 33a. However, in the case where the pairs of projections 33 are open to the outer side, it is not necessary to pass the adhesive tape through the through-holes, thus facilitating winding of the adhesive tape.

Furthermore, when, for example, the fastening band of FIG. 5 is used as the bundling member 20, the belt 21 is loosely wound around the cable bundle 10, and then the connector component 30 can be inserted into a gap between the belt 21 and the cable bundle 10. After inserting the connector component 30 so that the belt 21 is fitted into the recesses 33b, the belt 21 is fastened and thereby the bundling member 20 can be wound around the connector component 30 and the cable bundle 10 together.

Moreover, in the state in which the belt 21 is loosely wound, it is possible to remove the inserted connector component 30. Therefore, even if an operator installs an incorrect connector component 30 by mistake, it is possible to replace the incorrect connector component 30 in this state. On the other hand, in the first embodiment, even in the state in which the belt 21 is loosely wound, it is not possible to replace the connector component 30 without unwinding the belt 21.

Note that the same effects as those described above can be achieved as long as the pairs of projections 33 are open to the outer side. In the connector component 30 shown in FIGS. 1 to 4 for example, a configuration is also possible in which the bridge sections 35 are omitted and the pairs of projections 33 are open to the outer side.

Moreover, if a bundling band is used as the bundling member 20 also in the second embodiment, the operation is easier as compared with the case where an adhesive tape is used. This is because the use of an adhesive tape may require a step for cutting the tape into a predetermined length, and the adhesive tape may stick to another member.

As described above, the present invention has been described in detail, but the descriptions above are merely examples in all the aspects, and the present invention is not limited to them. A number of modifications that are not described as the examples may be construed as being included in the scope of the invention without departing therefrom.

LIST OF REFERENCE NUMERALS

10 Cable bundle
11 Cable branch line
12 Cable main line
20 Bundling member
30 Connector component
32 Housing body
33 Projection
33b Recess
35 Bridge section
40 Fixture
50 External member
322 Side surface

The invention claimed is:

1. A wire harness comprising: a cable bundle including a cable main line and a cable branch line that is branched from the cable main line; a connector component that is connected to the cable branch line on a radially outward side of the cable bundle, the connector component including on each of two sides thereof in a circumferential direction with respect to the central axis of the cable bundle, a pair of confining surfaces that face each other across a gap; the connector component including a housing body having a connector, the housing body and connector positioned between the pairs of confining surfaces on each of the two sides of the connector component; a bundling member that is disposed between the confining surfaces on each of the two sides of the connector component, and is wound around the connector component and the cable bundle together from the outer side; and a fixture that is fixed to the bundling member and to an external member; wherein the pairs of confining surfaces are open to the outer side, and the connector component has recesses on the two sides thereof, the pairs of confining surfaces form two end surfaces in a longitudinal direction of each recess.

2. The wire harness according to claim 1,
wherein the fixture and the cable bundle sandwich the connector component from opposite sides.

3. The wire harness according to claim 1,
wherein the pairs of confining surfaces project from side sections of the connector component,
the connector component further includes bridge sections that bridge front ends of the pairs of confining surfaces, and
the bundling member passes through through-holes that are formed by the pairs of confining surfaces, the side sections, and the bridge sections.

4. The wire harness according to claim 1,
wherein the fixture is molded into one piece with the bundling member.

5. The wire harness according to claim 1,
wherein the fixture includes a belt passage section through which the bundling member passes, and
a fixed section that is provided on the belt passage section on a side opposite to the cable bundle, and is fixed to the external member.

6. The wire harness according to claim 1,
wherein the bundling member is a bundling band.

7. A wire harness comprising:
a cable bundle including a cable main line and a cable branch line that is branched from the cable main line;
a connector component that is connected to the cable branch line on a radially outward side of the cable bundle, the connector component including on each of two sides thereof in a circumferential direction with respect to the central axis of the cable bundle, a pair of confining surfaces that face each other across a gap;
a bundling member that is disposed between the confining surfaces on each of the two sides of the connector component, and is wound around the connector component and the cable bundle together from the outer side; and
a fixture that is fixed to the bundling member and to an external member;
wherein the pairs of confining surfaces project from side sections of the connector component,
the connector component further includes bridge sections that bridge front ends of the pairs of confining surfaces, and
the bundling member passes through through-holes that are formed by the pairs of confining surfaces, the side sections, and the bridge sections.

* * * * *